(12) United States Patent
Ohno et al.

(10) Patent No.: US 9,669,796 B2
(45) Date of Patent: Jun. 6, 2017

(54) FOUR-POINT SEATBELT DEVICE

(71) Applicant: TOYOTA JIDOSHA KABUSHIKI KAISHA, Toyota-shi, Aichi-ken (JP)

(72) Inventors: Mitsuyoshi Ohno, Miyoshi (JP); Takuya Nezaki, Mizunami (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/205,434

(22) Filed: Jul. 8, 2016

(65) Prior Publication Data
US 2017/0028965 A1 Feb. 2, 2017

(30) Foreign Application Priority Data
Jul. 28, 2015 (JP) ................. 2015-148574

(51) Int. Cl.
*B60R 22/06* (2006.01)
*B60R 22/02* (2006.01)
*B60R 22/48* (2006.01)
*B60R 22/26* (2006.01)

(52) U.S. Cl.
CPC ............ *B60R 22/06* (2013.01); *B60R 22/023* (2013.01); *B60R 22/26* (2013.01); *B60R 22/48* (2013.01); *B60R 2022/027* (2013.01); *B60R 2022/263* (2013.01)

(58) Field of Classification Search
CPC combination set(s) only.
See application file for complete search history.

(56) References Cited

U.S. PATENT DOCUMENTS

| | | | |
|---|---|---|---|
| 3,830,518 A * | 8/1974 | Silber | B60R 22/06 280/804 |
| 5,141,249 A | 8/1992 | Saitoh et al. | |
| 5,709,408 A * | 1/1998 | Carraway, Jr. | B60R 22/206 180/268 |
| 6,869,105 B2 * | 3/2005 | Cheng | B60R 22/06 280/804 |
| 2004/0036270 A1* | 2/2004 | Roychoudhury | B60R 22/02 280/802 |
| 2004/0160051 A1* | 8/2004 | Cheng | B60R 22/06 280/801.1 |
| 2006/0220426 A1* | 10/2006 | Moffatt | B60N 2/42736 297/216.19 |

(Continued)

FOREIGN PATENT DOCUMENTS

| | | |
|---|---|---|
| JP | S61-57221 B2 | 12/1986 |
| JP | 2784079 B2 | 8/1998 |

(Continued)

*Primary Examiner* — Nicole Verley
(74) *Attorney, Agent, or Firm* — Oliff PLC

(57) ABSTRACT

In a four-point seatbelt device including a three-point seatbelt and an automatic belt, the automatic belt is actuated to dispose an anchor at a standby position after the three-point seatbelt has been placed over an occupant. During this operation, the anchor is disposed further to a rear side than a field of vision of the occupant facing toward a front side, for example, and a second webbing is placed in standby in an unrestrained state with respect to the occupant. Moreover, in a case in which a vehicle collision has been predicted by a PCS control section, the automatic belt is actuated to place the second webbing over the occupant automatically.

6 Claims, 4 Drawing Sheets

(56) References Cited

U.S. PATENT DOCUMENTS

2007/0246927 A1* 10/2007 Okada .................. B60R 22/00
          280/804
2011/0042925 A1* 2/2011 Lin .................... B60N 2/4882
          280/733

FOREIGN PATENT DOCUMENTS

JP          2004-009967 A      1/2004
JP          2007-230335 A      9/2007
JP          2015-054560 A      3/2015

* cited by examiner

FOUR-POINT SEATBELT DEVICE

CROSS-REFERENCE TO RELATED APPLICATION

This application claims priority under 35 USC 119 from Japanese Patent application No. 2015-148574 filed on Jul. 28, 2015, the disclosure of which is incorporated by reference herein.

BACKGROUND

Technical Field

The present disclosure relates to a four-point seatbelt device.

Related Art

A four-point seatbelt device described in Japanese Patent Application Laid-Open (JP-A) No. 2007-230335 includes a three-point seatbelt and a two-point seatbelt. Specifically, after the three-point seatbelt has been placed over an occupant, the two-point seatbelt is placed over the occupant so as to intersect with a shoulder belt of the three-point seatbelt. Both shoulders of the occupant are thereby restrained by the three-point seatbelt and the two-point seatbelt respectively, thereby enabling improved occupant restraint performance. Note that vehicle seatbelt devices are also described in Japanese Patent No. 2784079, and in JP-A Nos. S61-57221, 2015-054560, and 2004-009967.

However, in the four-point seatbelt device described above, the occupant experiences a sense of constriction due to the body of the occupant being restrained by the two-point seatbelt in addition to the three-point seatbelt. Moreover, the occupant has to put on the two-point seatbelt after putting on the three-point seatbelt, making the seatbelt device frustrating to wear.

SUMMARY

The present disclosure provides a four-point seatbelt device capable of improving wearability and improving restraint performance of an occupant, while alleviating a sense of constriction experienced by the occupant.

A first aspect of the present disclosure is a four-point seatbelt device including a three-point seatbelt including a first webbing that is placed over an occupant seated in a seat of a vehicle so as to restrain the shoulder on a vehicle width direction central side of the occupant and to restrain the waist of the occupant, and a two-point automatic seatbelt including a second webbing that on actuation is placed over the occupant and restrains the shoulder on a vehicle width direction outside of the occupant. The two-point automatic seatbelt is configured including (1) a retractor that is provided at the vehicle width direction central side of the seat, a leading end portion of the second webbing extending out from the retractor, (2) an anchor that is provided, at a guide rail extending in a vehicle front-rear direction along a roof side rail at the vehicle width direction outside of the seat, so as to be capable of moving through a slider, the leading end portion of the second webbing being fixed to the anchor, (3) a drive motor that is coupled to the slider and that is actuated to move the slider and the anchor along the guide rail, and (4) a controller that is electrically connected to a collision prediction sensor and that controls actuation of the drive motor. In a state prior to actuation of the two-point automatic seatbelt, the anchor is disposed at an initial position that allows the occupant to sit down in the seat. After the first webbing has been placed over the occupant, the drive motor is actuated to move the anchor to a standby position that is at a vehicle rear side of the initial position and that is a position partway along the guide rail, and the second webbing is placed in standby in an unrestrained state of the occupant at the standby position. In a case in which the controller has predicted a vehicle collision based on a signal output from the collision prediction sensor, the drive motor is actuated to move the anchor from the standby position toward the vehicle rear side, and the second webbing is placed over the occupant.

In the first aspect described above, the four-point seatbelt device includes the three-point seatbelt and the two-point automatic seatbelt. Specifically, the first webbing of the three-point seatbelt is placed over the occupant such that the vehicle width direction central side shoulder of the occupant and the waist of the occupant are restrained by the first webbing.

The two-point automatic seatbelt includes the retractor provided at the vehicle width direction central side of the seat. The second webbing extends out from the retractor, and the leading end portion of the second webbing is fixed to the anchor. The anchor is provided at the guide rail so as to be capable of moving through the slider, and the guide rail extends in the vehicle front-rear direction along the roof side rail at the vehicle width direction outside of the seat. The drive motor is coupled to the slider, and the drive motor is actuated by the controller that is electrically connected to the collision prediction sensor. In a state prior to actuation of the two-point automatic seatbelt, the anchor is disposed at the initial position that allows the occupant to sit down in the seat.

Note that in the two-point automatic seatbelt, after the first webbing has been placed over the occupant, the drive motor is actuated to move the anchor to the standby position that is at a vehicle rear side of the initial position and that is a position partway along the guide rail. In the standby position, the second webbing is placed in standby in an unrestrained state of the occupant. Accordingly, during normal travel of the vehicle, the second webbing can be placed in standby in a state that does not restrain the vehicle width direction outside shoulder of the occupant. This thereby enables a sense of constriction experienced by the occupant to be alleviated.

If the controller has predicted a vehicle collision based on a signal output from the collision prediction sensor, the drive motor is actuated to move the anchor from the standby position toward the vehicle rear side, and the second webbing is placed over the occupant. This thereby enables the second webbing to be placed over the occupant automatically in a case in which a vehicle collision has been predicted, enabling both shoulders of the occupant to be restrained by the first webbing and the second webbing respectively. Due to the above, wearability can be improved and occupant restraint performance can be improved, while alleviating a sense of constriction experienced by the occupant.

Note that in order to suppress obstruction of the field of vision of the occupant by the second webbing in the standby position during normal travel of the vehicle, in the standby position, the anchor is preferably disposed further to the vehicle rear side than the field of vision of the occupant when the occupant is facing toward the front side with a field of vision angle of 170°.

A second aspect of the present disclosure is the four-point seatbelt device of the first aspect, wherein a rear end portion of the guide rail is bent toward a vehicle lower side following a center pillar of the vehicle. In a case in which the controller has predicted a vehicle collision, the drive motor is actuated to dispose the slider at the rear end portion of the guide rail from the standby position.

In the second aspect described above, the anchor (leading end portion of the second webbing) that is moved from the standby position toward the vehicle rear side is disposed further to the vehicle lower side than when at the standby position. This thereby enables the vehicle width direction outside shoulder of the occupant to be restrained by the second webbing in a state in which the anchor (leading end portion of the second webbing) has been brought closer to the shoulder of the occupant. This thereby enables a further improvement in occupant restraint performance.

The first aspect and the second aspect described above enable an improvement in wearability and an improvement in occupant restraint performance, while alleviating a sense of constriction experienced by the occupant.

A third aspect of the present disclosure is the four-point seatbelt device of either the first aspect or the second aspect, wherein the controller is electrically connected to a direction indicator of the vehicle. In a case in which the controller has detected actuation of the direction indicator, the drive motor is actuated to move the anchor from the standby position toward the vehicle rear side.

In the third aspect described above, both shoulders of the occupant are restrained by the first webbing and the second webbing respectively, for example when the vehicle changes lanes, thereby enabling the sitting posture of the occupant to be stabilized. Moreover, a field of vision to the side of the vehicle can be suppressed from being obstructed by the second webbing.

The third aspect described above enables the sitting posture of the occupant to be stabilized when the vehicle changes lanes, for example, and enables the field of vision of the occupant to the side of the vehicle to be suppressed from being obstructed by the second webbing.

A fourth aspect of the present disclosure is the four-point seatbelt device of any one of the first aspect to the third aspect, wherein the controller is electrically connected to a brake pedal sensor or an acceleration sensor of the vehicle. In a case in which the controller has detected a sudden deceleration of the vehicle based on a signal output from the brake pedal sensor or from the acceleration sensor to the controller, the drive motor is actuated to move the anchor from the standby position toward the vehicle rear side.

In the fourth aspect described above, both shoulders of the occupant moving toward the vehicle front side under inertia during sudden deceleration of the vehicle can be restrained by the first webbing and the second webbing respectively.

A fifth aspect of the present disclosure is the four-point seatbelt device of any one of the first aspect to the fourth aspect, wherein the controller is electrically connected to a vehicle stability control device that suppresses lateral sliding of the vehicle. In a case in which the controller has detected actuation of the vehicle stability control device, the drive motor is actuated to move the anchor from the standby position toward the vehicle rear side.

In the fifth aspect described above, both shoulders of the occupant are restrained by the first webbing and the second webbing respectively during actuation of the vehicle stability control (VSC) device, thereby enabling an improvement in occupant safety.

A sixth aspect of the present disclosure is the four-point seatbelt device of any one of the first aspect to the fifth aspect, wherein the controller is electrically connected to at least one of a yaw sensor or a rollover detection sensor of the vehicle. In a case in which the controller has detected a sudden turn or a rollover of the vehicle based on a signal output from the yaw sensor or the rollover detection sensor to the controller, the drive motor is actuated to move the anchor from the standby position toward the vehicle rear side.

In the sixth aspect described above, both shoulders of the occupant are restrained by the first webbing and the second webbing respectively during a sudden turn or during a rollover of the vehicle, thereby enabling an improvement in occupant safety.

The fifth aspect and the sixth aspect described above enable an improvement in occupant safety.

BRIEF DESCRIPTION OF THE DRAWINGS

Exemplary embodiments of the present disclosure will be described in detail based on the following figures, wherein.

DETAILED DESCRIPTION

Figure 1:
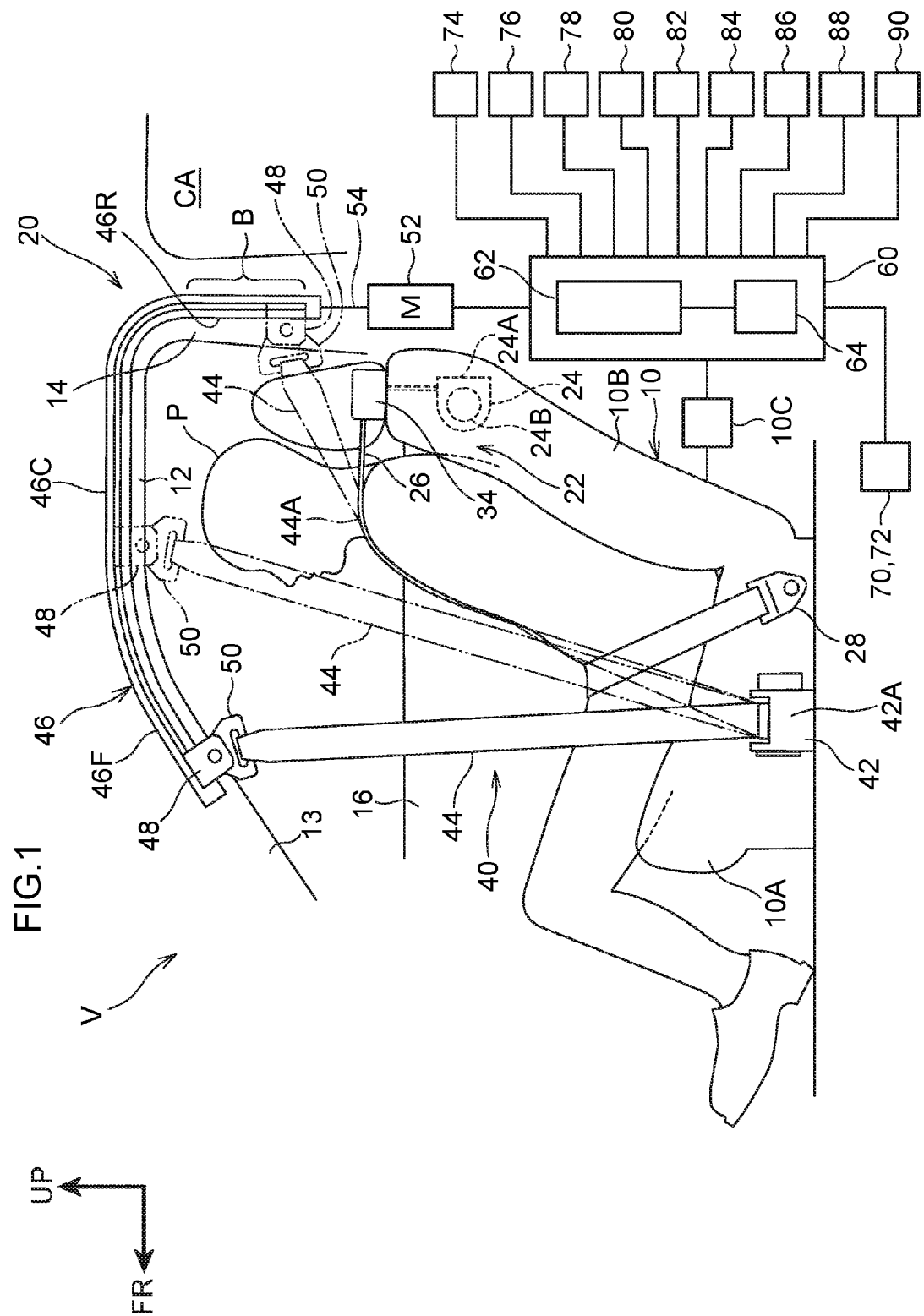
FIG. 1 is a schematic side view illustrating a right side section of a front section of a vehicle applied with a four-point seatbelt device according to an exemplary embodiment, as viewed from a vehicle width direction central side.

Explanation follows regarding a four-point seatbelt device 20 according to an exemplary embodiment, with reference to the drawings. In the drawings, the arrow FR, the arrow UP, and the arrow RH respectively indicate a vehicle front side, vehicle upper side, and vehicle right side of a vehicle (automobile) V applied with the four-point seatbelt device 20, as appropriate. In the following explanation, unless specifically indicated otherwise, reference simply to the front and rear, up and down, and left and right directions refers to the front and rear in a vehicle front-rear direction, up and down in a vehicle vertical direction, and the left and right of the vehicle (when facing forward).

Figure 3:
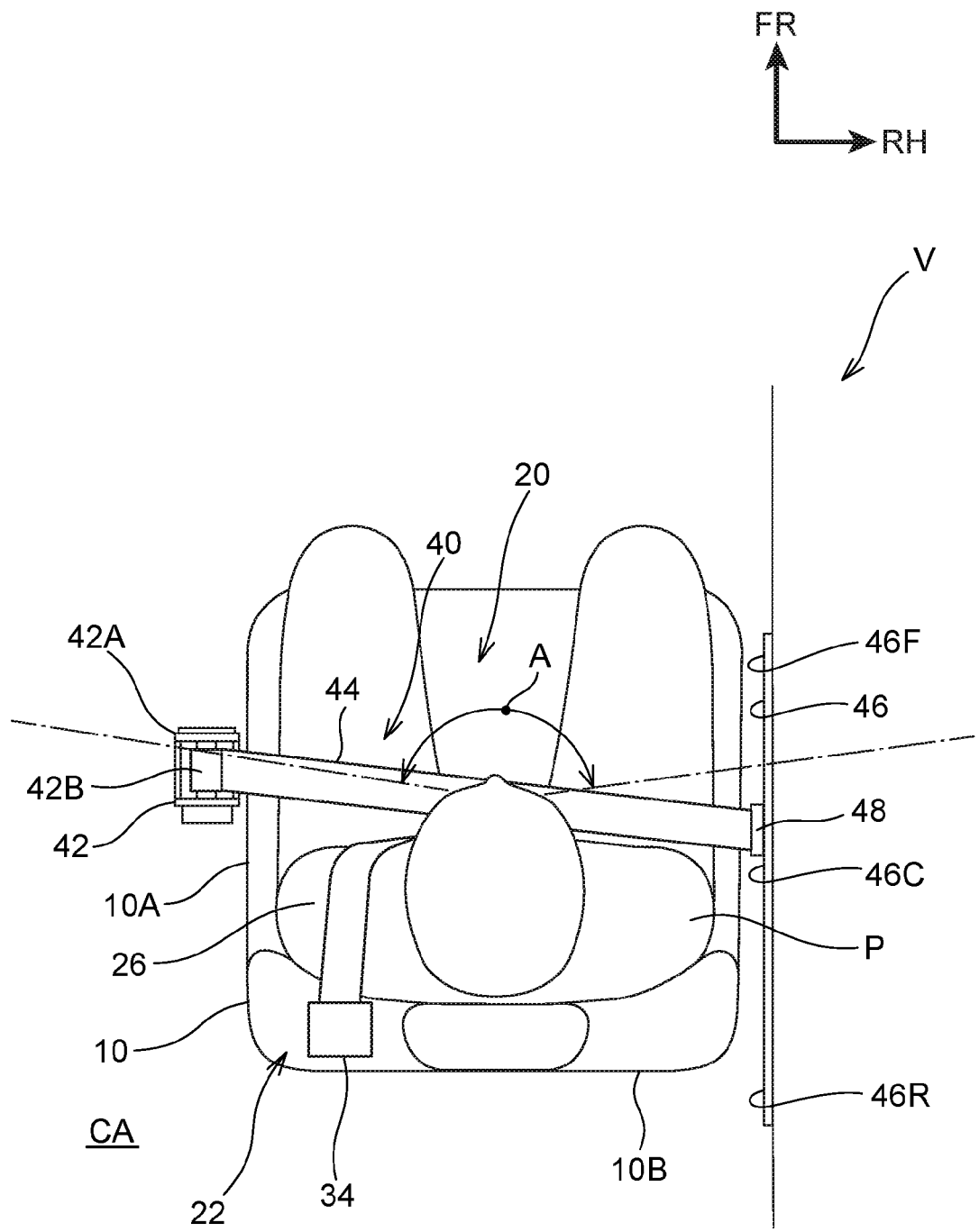
FIG. 3 is a schematic plan view illustrating the two-point automatic seatbelt at the standby position illustrated in FIG. 2, as viewed from a vehicle upper side.
Figure 4:
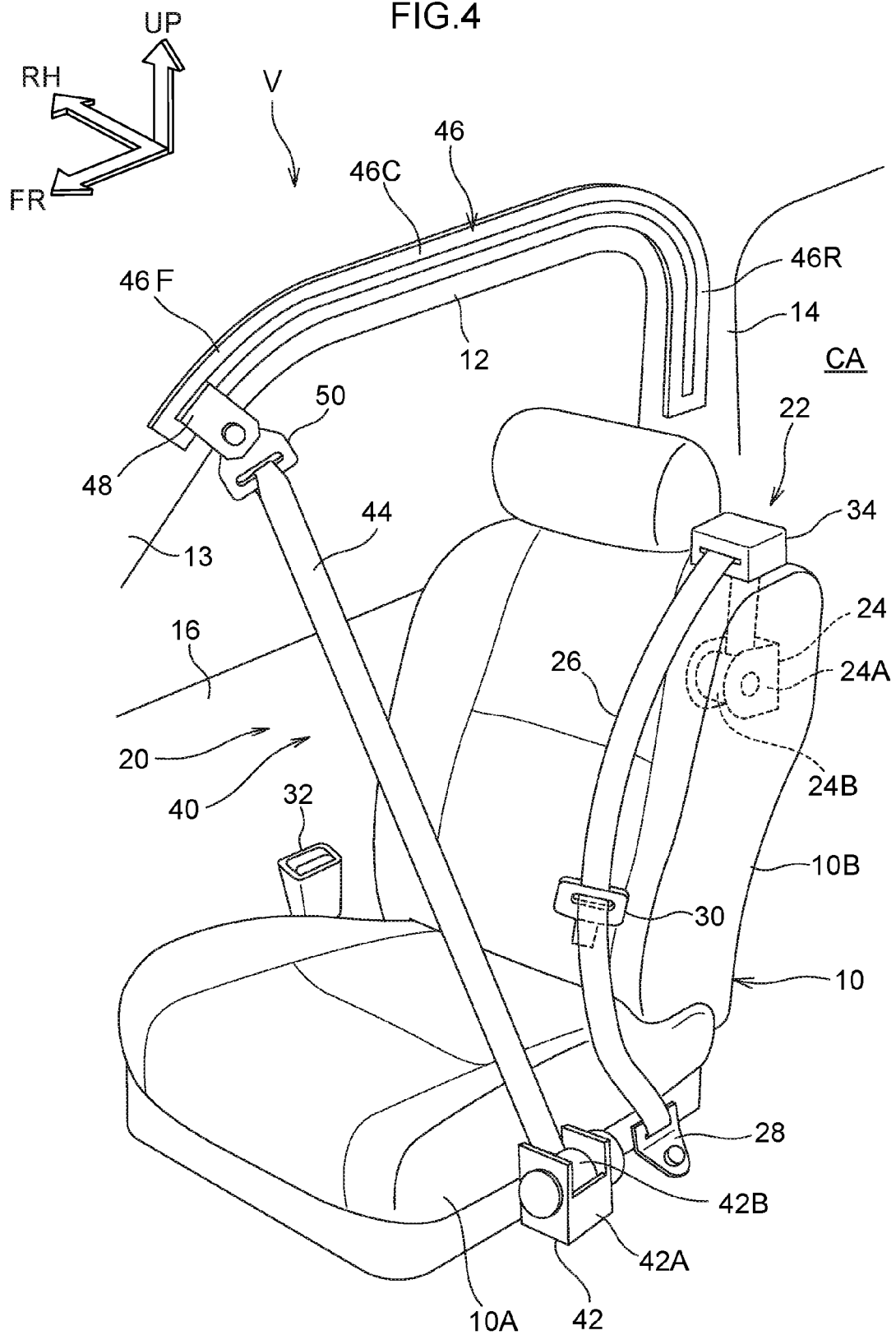
FIG. 4 is a schematic perspective view illustrating a state in which the two-point automatic seatbelt of the four-point seatbelt device illustrated in FIG. 2 is disposed at an initial position, as viewed obliquely from the front on a vehicle width direction central side.

FIG. 4 is a perspective view schematically illustrating a right side section of a front section of a cabin CA of the vehicle V applied with the four-point seatbelt device 20. As illustrated in FIG. 4, a seat 10 for a front passenger (referred to below as the front passenger seat 10) is installed in the right side section of the front section of the cabin CA. The front passenger seat 10 is configured including a seat cushion 10A that supports the buttocks of a seated occupant P (see FIG. 1 to FIG. 3), and a seatback 10B that supports the back of the occupant P. A lower end portion of the seatback 10B is coupled to a rear end portion of the seat cushion 10A through a reclining mechanism (not illustrated in the drawings) so as to be capable of swinging. A seat width direction of the front passenger seat 10 matches the vehicle width direction, a seat front-rear direction of the front passenger seat 10 matches the vehicle front-rear direction, and a seat vertical direction of the front passenger seat 10 matches the vehicle vertical direction.

As illustrated in FIG. 1, the front passenger seat 10 is configured as what is referred to as a power seat, and includes a memory 10C that stores seat positions of the front passenger seat 10 (a front-rear position and an vertical position of the seat cushion 10A, a reclining position of the seatback 10B, and the like) for each occupant P. The memory 10C is electrically connected to an ECU 60, described later, of the vehicle V. As described in more detail later, the ECU 60 actuates a two-point automatic seatbelt 40, described later, based on the seat position data stored in the memory 10C of the front passenger seat 10.

A seat for a driver (driver's seat), not illustrated in the drawings, is installed at the left side of the front passenger seat 10 (at a left side section of the front section of the cabin CA). The driver's seat is configured as a power seat, similarly to the front passenger seat 10. The front passenger seat 10 and the driver's seat are each provided with the four-point seatbelt device 20 according to the present exemplary embodiment, and the four-point seatbelt device 20 provided at the front passenger seat 10 and the four-point seatbelt device 20 provided at the driver's seat are configured with left-right symmetry to each other. Accordingly, in the following explanation, explanation is given regarding the four-point seatbelt device 20 provided at the front passenger seat 10, and explanation regarding the four-point seatbelt device 20 provided at the driver's seat is omitted.

Four-Point Seatbelt Device 20

As illustrated in FIG. 4, the four-point seatbelt device 20 is configured including a three-point seatbelt 22 and the two-point automatic seatbelt 40 (referred to below as the automatic belt 40). First, explanation follows regarding the configuration of the three-point seatbelt 22 and the automatic belt 40, followed by explanation regarding actuation timings and the like of the automatic belt 40.

Three-Point Seatbelt 22

The three-point seatbelt 22 is configured including a first retractor 24 that is installed inside the seatback 10B of the front passenger seat 10, and a first webbing 26 that restrains the upper body (upper half of the body) and waist of the occupant P (omitted from illustration in FIG. 4). The first retractor 24 includes a frame 24A configuring an outer frame of the first retractor 24, and the frame 24A is fixed to a seatback frame (not illustrated in the drawings) configuring framework of the seatback 10B.

A spool 24B is provided inside the frame 24A. The spool 24B is formed in a substantially circular cylinder shape overall, and is rotatably supported by the frame 24A with its axial direction in the vehicle width direction. A base end portion of the first webbing 26, described later, is coupled and fixed to the spool 24B. If the spool 24B is rotated in a take-up direction, the first webbing 26 is taken up from its base end side onto an outer peripheral portion of the spool 24B, and if the first webbing 26 is pulled from a leading end side, the first webbing 26 is pulled out while, accompanying this, the spool 24B rotates in a pull-out direction.

A biasing spring, not illustrated in the drawings, is coupled to the spool 24B. The biasing spring is configured by a mainspring. The spool 24B is biased toward the take-up direction by the biasing spring. The first retractor 24 also includes a known locking mechanism (not illustrated in the drawings). The locking mechanism actuates to prevent rotation of the spool 24B in the pull-out direction during sudden vehicle deceleration, or when the first webbing 26 is pulled out sharply, rotating the spool 24B sharply in the pull-out direction, and the like.

The first webbing 26 is formed in an elongated strap shape, and as described above, the base end portion of the first webbing 26 is coupled and fixed to the spool 24B. The first webbing 26 extends out from the spool 24B toward a seat upper side, is inserted through a guide member 34 provided at a vehicle width direction central side of an upper end portion of the seatback 10B, and extends out from the guide member 34 toward the front side. A leading end portion of the first webbing 26 is coupled and fixed to an anchor 28, and the anchor 28 is fixed to a side face on a vehicle width direction central side of a rear end portion of the seat cushion 10A. Accordingly, in a state prior to the first webbing 26 being placed over the body of the occupant P, the first webbing 26 extends out from the guide member 34 toward the lower side at a front side of the seatback 10B.

Figure 2:
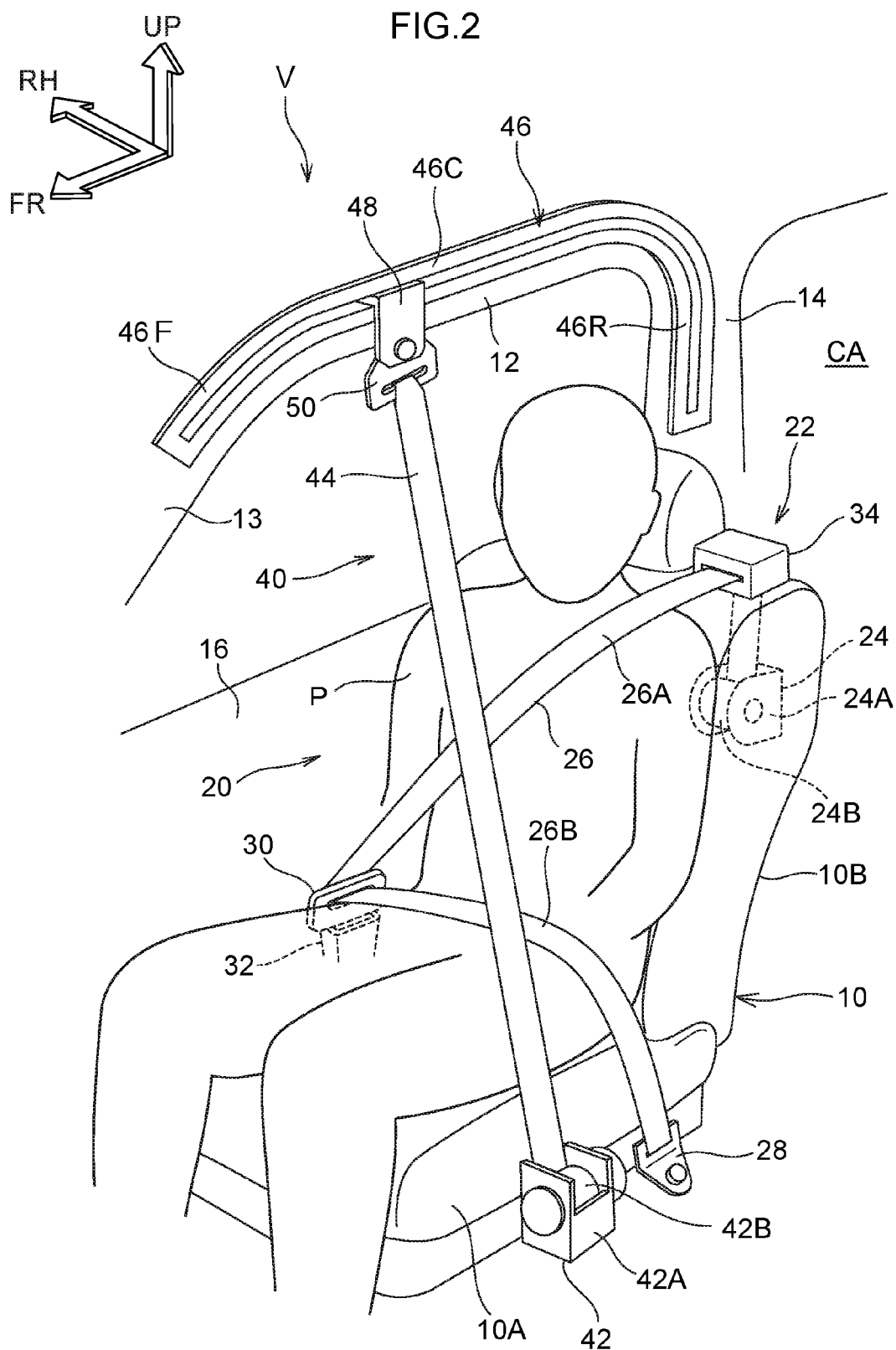
FIG. 2 is a schematic perspective view illustrating a state in which a two-point automatic seatbelt is disposed at a standby position in the four-point seatbelt device illustrated in FIG. 1, as viewed obliquely from the front on a vehicle width direction central side.

The first webbing 26 is further provided with a movable tongue 30. As illustrated in FIG. 2, the first webbing 26 is placed over the body of the occupant P by the occupant P engaging the tongue 30 with a buckle 32 provided at a vehicle width direction outside of a rear end portion of the seat cushion 10A. Specifically, the first webbing 26 is placed over the upper body of the occupant P by wrapping the first webbing 26 across the upper body of the occupant P from the shoulder on the vehicle width direction central side to the vehicle width direction outside of the waist of the occupant P. The first webbing 26 is also placed over the waist of the occupant P by wrapping the first webbing 26 across the occupant P from the vehicle width direction outside to the vehicle width direction central side. Configuration is thereby made such that the vehicle width direction central side shoulder of the occupant P is restrained by the first webbing 26 (this portion of the first webbing 26 is referred to below as a first shoulder belt portion 26A), and the waist of the occupant P is restrained by the first webbing 26 (this portion of the first webbing 26 is referred to below as a lap belt portion 26B).

Automatic Belt 40

As illustrated in FIG. 4, the automatic belt 40 is configured including a second retractor 42, serving as a "retractor", installed at the vehicle width direction central side of the front passenger seat 10, and a second webbing 44 for restraining the upper body (upper half of the body) of the occupant P. The automatic belt 40 includes a guide rail 46 provided at a roof side rail 12 (vehicle body) of the vehicle V, a slider 48 movably (slidably) provided at the guide rail 46, and an anchor 50 that is coupled to the slider 48, and to which a leading end portion of the second webbing 44 is coupled and fixed. The automatic belt 40 further includes a drive motor 52 (see FIG. 1) for moving the slider 48. Explanation follows regarding configuration of each section.

The second retractor 42 includes a frame 42A configuring an outer frame of the second retractor 42. The frame 42A is fixed to the front passenger seat 10 at a side face on the vehicle width direction central side of the seat cushion 10A. Specifically, as viewed from the side, the frame 42A (second retractor 42) is disposed substantially at a lower side of the waist of the occupant P (see FIG. 1).

A spool 42B is provided inside the frame 42A. The spool 42B is formed in a substantially circular cylinder shape overall, and is rotatably supported by the frame 42A with its axial direction in the vehicle front-rear direction. A base end portion of the second webbing 44, described later, is coupled and fixed to the spool 42B. If the spool 42B is rotated in a take-up direction, the second webbing 44 is taken up from its base end side onto an outer peripheral portion of the spool 42B, and if the second webbing 44 is pulled from a leading end side, the second webbing 44 is pulled out while, accompanying this, the spool 42B rotates in a pull-out direction.

Similarly to in the first retractor 24, a biasing spring, not illustrated in the drawings, is coupled to the spool 42B. The biasing spring is configured by a mainspring, and the spool 42B is biased in the take-up direction by the biasing spring.

The second webbing 44 is formed in an elongated strap shape, and as described above, the base end portion of the second webbing 44 is coupled and fixed to the spool 42B. The second webbing 44 extends out from the spool 42B toward the upper side and the vehicle width direction outside. A leading end portion of the second webbing 44 is fixed to the anchor 50, described later.

The guide rail 46 is formed in a substantially elongated shape, and extends along the front-rear direction following the roof side rail 12 of the vehicle V. A front end portion 46F of the guide rail 46 is inclined toward the lower side on progression toward the front side, so as to follow an upper end portion of a front pillar 13 of the vehicle V, and a front end of the guide rail 46 is positioned on the vehicle width direction outside of a front end portion of the front passenger seat 10. An intermediate portion 46C of the guide rail 46 extends out in a substantially straight line shape from a rear end of the front end portion 46F toward the rear side. A rear end portion 46R of the guide rail 46 is bent toward the lower side, and extends along the vertical direction following a center pillar 14 of the vehicle V, and is positioned to the upper side and rear side of the seatback 10B. Although not illustrated in the drawings, as viewed in cross-section along its length direction, the guide rail 46 is formed with a substantially C-shaped cross-section profile opening toward the vehicle width direction central side (cabin CA side). Part of the slider 48 is movably inserted inside the guide rail 46, and the slider 48 is configured so as to be capable of moving along the length direction of the guide rail 46.

The anchor 50 is fixed to the slider 48, and the leading end portion of the second webbing 44 described above is coupled and fixed to the anchor 50. The leading end portion of the second webbing 44 is thereby moved along the front-rear direction by moving the slider 48 along the guide rail 46.

As illustrated in FIG. 1, the drive motor 52 is coupled to the slider 48 through a flexible wire 54, and the wire 54 is laid out inside the guide rail 46. Actuating the drive motor 52 moves the wire 54 inside the guide rail 46, moving (sliding) the slider 48 along the guide rail 46. The drive motor 52 is electrically connected to a motor control section 62 of the ECU 60, serving as a "controller", and the drive motor 52 is actuated under the control of the motor control section 62.

Explanation follows regarding the ECU 60. The ECU 60 is configured including the motor control section 62 described above and a collision avoidance control section 64 (referred to below as the Pre-Crash Safety (PCS) control section 64). The motor control section 62 and the PCS control section 64 are electrically connected together. The PCS control section 64 is electrically connected to a collision prediction sensor 70 that predicts (foresees) a frontal collision of the vehicle V, and a collision prediction sensor 72 that foresees a side-on collision of the vehicle V. The collision prediction sensor 70 is configured by a stereo camera provided in the vicinity of the vehicle width direction center of an upper portion of a windshield glass of the vehicle V, a millimeter wave radar provided at the rear side of a front grille of the vehicle V, or the like. Similarly to the collision prediction sensor 70, the collision prediction sensor 72 is configured by a stereo camera, a millimeter wave radar, or the like, and is provided at a side section of the vehicle V. The collision prediction sensors 70, 72 measure the distance to potential collision bodies, relative speeds between the vehicle V and the collision bodies, and the like. If the PCS control section 64 has predicted a frontal collision or a side-on collision of the vehicle V based on measurement data from the collision prediction sensors 70, 72 (if a frontal collision or a side-on collision has been determined to be unavoidable), the drive motor 52 is actuated under the control of the motor control section 62 based on a signal output from the PCS control section 64 to the motor control section 62.

The memory 10C of the front passenger seat 10 described above is electrically connected to the motor control section 62 of the ECU 60. A door switch 74 that detects opening and closing of a door 16 of the vehicle V, an ignition switch 76 of the vehicle V, and a buckle switch 78 that detects engagement of the tongue 30 with the buckle 32 (wearing of the three-point seatbelt 22 by the occupant P) are also respectively electrically connected to the motor control section 62. The door switch 74 is configured to switch ON when the door 16 closes a door opening of the vehicle V, and the buckle switch 78 is configured to switch ON when the tongue 30 is engaged with the buckle 32.

Next, explanation follows regarding positions and operation timings of the slider 48 (anchor 50) of the automatic belt 40. In a state prior to the occupant P sitting down in the front passenger seat 10, the automatic belt 40 is in a pre-actuation state. Specifically, the slider 48 (anchor 50) is disposed at the front end of the guide rail 46 (the position illustrated by solid lines in FIG. 1; referred to below as the "initial position"). In the initial position, configuration is made such that the second webbing 44 is disposed at a spacing a predetermined distance toward the front side of the seatback 10B so as to allow the occupant P to sit down in the front passenger seat 10 (see FIG. 4).

After the occupant P sits down in the front passenger seat 10, the door switch 74, the ignition switch 76, and the buckle switch 78 switch ON, and the drive motor 52 is actuated under the control of the motor control section 62 so as to move the slider 48 (anchor 50) from the initial position toward the rear side (to the position of the slider 48 (anchor 50) illustrated by double-dotted intermittent lines in FIG. 1; this position is referred to below as the "standby position"). Namely, the slider 48 (anchor 50) is moved from the initial position to the standby position (see FIG. 2) after the first webbing 26 of the three-point seatbelt 22 has been placed over the occupant P, and the engine of the vehicle V has been started up, in a closed state of the door 16.

In the standby position, the slider 48 (anchor 50) is disposed at a length direction intermediate portion (partway position) of the guide rail 46 and is positioned at the vehicle width direction outside side of the occupant P, and the second webbing 44 is in a state that does not restrain the upper body of the occupant P. Specifically, as illustrated in FIG. 3, the anchor 50 is disposed further to the rear side than a field of vision A of the occupant P when facing toward the front side with a field of vision angle of 170°, and the second webbing 44 is disposed close to the front side of the occupant P so as to leave a gap between the upper body of the occupant P and the second webbing 44. Accordingly, in the standby position, a portion of the second webbing 44 that is at the vehicle width direction outside of the head of the occupant P is disposed further to the rear side than the field of vision A, and the second webbing 44 is suppressed from obstructing the field of vision of the occupant P when facing toward the front side.

Explanation follows regarding an example of settings for the standby position of the slider 48 (anchor 50). In setting the standby position above, the ECU 60 computes a relative position of the front passenger seat 10 with respect to the guide rail 46 (a relative position of the seat cushion 10A, and a relative reclining position of the seatback 10B, with respect to the guide rail 46) based on the seat position data stored in advance in the memory 10C of the front passenger seat 10. Moreover, position data for both eyes (eye points) of the occupant P with respect to the front passenger seat 10, and position data of the upper body of the occupant P with respect to the front passenger seat 10, are, for example, stored using a dummy (as an example, an American male 95 percentile (AM95) (a dummy of an occupant with a large physical frame)). The ECU 60 computes the standby position of the anchor 50 on the guide rail 46 based on the relative position of the front passenger seat 10 with respect to the guide rail 46, and the position data for the eye points and the upper body of the occupant P. The ECU 60 then sets an actuation time and the like of the drive motor 52 based on the computed standby position of the anchor 50, and actuates the drive motor 52.

Configuration is made such that when the PCS control section 64 has predicted a frontal collision or a side-on collision of the vehicle V when the vehicle V is travelling, the drive motor 52 is actuated under the control of the motor control section 62 so as to move the slider 48 (anchor 50) further to the seat rear side than the standby position. Specifically, the slider 48 (anchor 50) is disposed at the rear end portion 46R of the guide rail 46 (the position of the slider 48 (anchor 50) illustrated by single-dotted intermittent lines in FIG. 1; this position is referred to below as the "restraint position"). In the restraint position, the second webbing 44 is wrapped across the occupant P from the vehicle width direction outside shoulder to the vehicle width direction central side of the waist, so as to be placed over the upper body of the occupant P (see the second webbing 44 illustrated by single-dotted intermittent lines in FIG. 1). Accordingly, in the restraint position, the vehicle width direction outside shoulder of the occupant P is restrained by the second webbing 44 (this portion of the second webbing 44 is referred to below as the second shoulder belt portion 44A (see FIG. 1)). Note that in the present exemplary embodiment, in the restraint position, the slider 48 (anchor 50) is disposed at the rear end of the guide rail 46 (at a lower end of the rear end portion 46R). However, it is sufficient that the slider 48 (anchor 50) be disposed within a predetermined range (anchor area B) of the rear end portion 46R of the guide rail 46 in the restraint position.

Explanation follows regarding operation of the present exemplary embodiment. In the four-point seatbelt device 20 configured as described above, in the state of the automatic belt 40 prior to actuation, the slider 48 (anchor 50) is disposed in the initial position, and the occupant P is able to sit down in the front passenger seat 10. Then, after the occupant P sits down in the front passenger seat 10 and puts on the first webbing 26 of the three-point seatbelt 22, and the engine of the vehicle V is started in a closed state of the door 16, the door switch 74, the ignition switch 76, and the buckle switch 78 switch ON. The drive motor 52 is accordingly actuated under the control of the motor control section 62, and the slider 48 (anchor 50) is moved from the initial position to the standby position. Namely, the anchor 50 is disposed further to the rear side than the field of vision A of the occupant P facing toward the front side, and the second webbing 44 is disposed close to the front side of the occupant P so as to leave a gap between the upper body of the occupant P and the second webbing 44. In this state, the upper body of the occupant P is not restrained by the second webbing 44, although the upper body of the occupant P is restrained by the first webbing 26. Specifically, the vehicle width direction central side shoulder of the occupant P is restrained by the first shoulder belt portion 26A of the first webbing 26, and the waist of the occupant P is restrained by the lap belt portion 26B of the first webbing 26. Accordingly, since the second webbing 44 is in standby in an unrestrained state with respect to the upper body of the occupant P during normal travel of the vehicle V, a sense of constriction experienced by the occupant P due to the second webbing 44 is alleviated.

If the PCS control section 64 of the ECU 60 has predicted a frontal collision or a side-on collision of the vehicle V based on the measurement data of the collision prediction sensors 70, 72 when the vehicle V is travelling, the drive motor 52 is actuated under the control of the motor control section 62 of the ECU 60. The slider 48 (anchor 50) is thereby moved from the standby position to the restraint position, and the second webbing 44 is placed over the upper body of the occupant P. The vehicle width direction outside shoulder of the occupant P is thereby restrained by the second shoulder belt portion 44A of the second webbing 44. As a result, if a frontal collision or a side-on collision of the vehicle V has been predicted, both shoulders of the occupant P are restrained, by the three-point seatbelt 22 (the first webbing 26) and the automatic belt 40 (the second webbing 44) respectively, thereby improving restraint performance of the occupant P. Specifically, both shoulders of the occupant P can be restrained from moving toward the front side under inertia after a frontal collision of the vehicle V has been predicted. Moreover, for example, in the event of a side-on collision from the driver's seat side (or a side-on collision from the front passenger seat 10 side), the occupant P tends to move toward the driver's seat side (or the driver toward the front passenger seat 10 side) under inertia, and so the vehicle width direction outside shoulder of the occupant P (or the driver) can be effectively restrained by the second webbing 44.

As described above, in the four-point seatbelt device 20 including the three-point seatbelt 22 and the automatic belt 40, the automatic belt 40 is actuated after the first webbing 26 of the three-point seatbelt 22 has been placed over the occupant P. When this is performed, the anchor 50 is disposed further to the rear side than the field of vision A of the occupant P facing toward the front side, and the second webbing 44 is placed in standby in an unrestrained state with respect to the occupant P. Accordingly, during normal travel of the vehicle V, the second webbing 44 can be placed in standby in a state in which the vehicle width direction outside shoulder of the occupant P is not restrained, while suppressing obstruction of the field of vision of the occupant P facing toward the front side by the second webbing 44. This thereby enables a sense of constriction experienced by the occupant P to be alleviated.

If a collision of the vehicle V is predicted by the PCS control section 64, the automatic belt 40 is actuated under the control of the motor control section 62, and the second webbing 44 is placed over the upper body of the occupant P. This thereby enables the second webbing 44 to be automatically placed over the occupant P such that both shoulders of the occupant P are restrained by the first webbing 26 and the second webbing 44 respectively after a collision of the vehicle V has been predicted. This enables improved wearability and improved restraint performance of the occupant P, while alleviating a sense of constriction experienced by the occupant P.

If a collision of the vehicle V has been predicted, the automatic belt 40 is actuated, and the anchor 50 is disposed at the rear end portion 46R where the guide rail 46 extends in the vertical direction along the center pillar 14. Accordingly, the anchor 50 (the leading end portion of the second webbing 44) is disposed at a lower side when in the restraint position than when in the standby position. The vehicle width direction outside shoulder of the occupant P can accordingly by restrained by the second webbing 44 in a state in which the anchor 50 (the leading end portion of the second webbing 44) has been brought closer to the shoulder of the occupant P in the vertical direction. This thereby enables a further improvement to the restraint performance of the occupant P.

Note that in the present exemplary embodiment, configuration is made in which the automatic belt 40 is actuated under the control of the motor control section 62 and the second webbing 44 is placed over the upper body of the occupant P after a collision of the vehicle V has been predicted by the PCS control section 64. However, the automatic belt 40 may also be actuated to place the second webbing 44 over the upper body of the occupant P in the following cases in addition to when a collision of the vehicle V has been predicted. Explanation follows regarding variations of actuation of the automatic belt 40.

Variation 1

In Variation 1, configuration is made in which the drive motor 52 is actuated by the motor control section 62, and the slider 48 (anchor 50) disposed in the standby position is moved to the restraint position, if a direction indicator (winker) 80 of the vehicle V is actuated. Specifically, as illustrated in FIG. 1, the direction indicator 80 is electrically connected to the ECU 60. If the ECU 60 detects that the direction indicator 80 has been actuated, the drive motor 52 is actuated by the motor control section 62, and the slider 48 (anchor 50) disposed at the standby position is moved to the restraint position. Accordingly, if the vehicle V changes lanes or turns, for example, the second webbing 44 disposed at the standby position is moved toward the rear side, and both shoulders of the occupant P are restrained by the first webbing 26 and the second webbing 44 respectively. This thereby enables a field of vision to the side of the vehicle V to be suppressed from being obstructed by the second webbing 44 in a case in which the vehicle V changes lanes or turns, and enables the sitting posture of the occupant P to be stabilized.

Variation 2

In Variation 2, configuration is made in which the drive motor 52 is actuated by the motor control section 62, and the slider 48 (anchor 50) disposed in the standby position is moved to the restraint position, if a sudden braking operation is performed in the vehicle V and the vehicle V decelerates suddenly. Specifically, as illustrated in FIG. 1, a brake pedal sensor 82 and an acceleration sensor 84 are electrically connected to the ECU 60. If the ECU 60 detects that the operation level of a brake pedal has suddenly increased based on a signal output from the brake pedal sensor 82 to the ECU 60, or if the ECU 60 detects sudden deceleration of the vehicle V based on a signal output from the acceleration sensor 84 to the ECU 60, the drive motor 52 is actuated by the motor control section 62, and the slider 48 (anchor 50) disposed at the standby position is moved to the restraint position. This thereby enables both shoulders of the occupant P, moving toward the front side under inertia during the sudden deceleration of the vehicle V, to be restrained by the first webbing 26 and the second webbing 44 respectively.

Variation 3

In Variation 3, configuration is made in which the drive motor 52 is actuated by the motor control section 62, and the slider 48 (anchor 50) disposed in the standby position is moved to the restraint position, if a vehicle stability control system device 86 (referred to below as the "VSC device 86") that suppresses lateral sliding of the vehicle V has been actuated. Specifically, as illustrated in FIG. 1, the VSC device 86 is electrically connected to the ECU 60. After the ECU 60 detects that the VSC device 86 has been actuated, the drive motor 52 is actuated by the motor control section 62, and the slider 48 (anchor 50) disposed at the standby position is moved to the restraint position. Accordingly, both shoulders of the occupant P are restrained by the first webbing 26 and the second webbing 44 respectively during actuation of the VSC device 86, thereby enabling improved stability of the occupant P.

Variation 4

In Variation 4, configuration is made in which the drive motor 52 is actuated by the motor control section 62, and the slider 48 (anchor 50) disposed in the standby position is moved to the restraint position, if the ECU 60 has detected a sudden turn or a rollover of the vehicle V. Specifically, as illustrated in FIG. 1, at least one of a yaw sensor 88 or a rollover detection sensor 90 are electrically connected to the ECU 60. After the ECU 60 detects a sudden turn or a rollover of the vehicle V based on signals output from the yaw sensor 88 or the rollover detection sensor 90 to the ECU 60, the drive motor 52 is actuated by the motor control section 62, and the slider 48 (anchor 50) disposed at the standby position is moved to the restraint position. Accordingly, both shoulders of the occupant P are restrained by the first webbing 26 and the second webbing 44 respectively during a sudden turn or a rollover of the vehicle V, thereby enabling improved stability of the occupant P.

Note that the respective Variations 1 to 4 may be configured in combination in the four-point seatbelt device 20.

In the present exemplary embodiment, configuration is made in which the front passenger seat 10 is configured as a power seat, and the ECU 60 computes the seat position of the front passenger seat 10 based on the memory 10C of the front passenger seat 10. However, computation of the seat position of the front passenger seat 10 is not limited thereto. For example, configuration may be made in which the position and the like of the front passenger seat 10 are stored in the memory, and the ECU 60 computes the position of the front passenger seat 10 with respect to the guide rail 46, even in cases in which the front passenger seat 10 is configured as a manual seat. For example, configuration may be made in which the position of the seat cushion 10A with respect to the guide rail 46 is detected and stored in the memory by providing a position sensor to the seat cushion 10A. Moreover, configuration may be made in which the reclining position of the seatback 10B is detected and stored in the memory by providing a position sensor to the reclining mechanism of the front passenger seat 10.

Moreover, configuration may be made in which the drive motor 52 can be operated by operation of the occupant P, and a standby position for each occupant P is stored in the ECU 60 according to the operation of the occupant P. The drive motor 52 may then be actuated by the motor control section 62 based on the stored data.

From the perspective of improving restraint performance of the occupant P, the restraint position of the slider 48

(anchor 50) is preferably set at the rear end portion 46R of the guide rail 46. However, for example, in consideration of the movement time (actuation time) of the slider 48 (anchor 50) and the like, the restraint position of the slider 48 (anchor 50) may be set at a rear end portion of the intermediate portion 46C of the guide rail 46. Even in such cases, the vehicle width direction outside shoulder of the occupant P is restrained by the second webbing 44, thereby enabling improved restraint performance of the occupant P in comparison to cases in which the upper body of the occupant P is only restrained by the three-point seatbelt 22.

What is claimed is:

1. A four-point seatbelt device comprising:
a three-point seatbelt including a first webbing that is placed over an occupant seated in a seat of a vehicle so as to restrain the shoulder on a vehicle width direction central side of the occupant and to restrain the waist of the occupant; and
a two-point automatic seatbelt including:
a second webbing that on actuation is placed over the occupant and restrains the shoulder on a vehicle width direction outside of the occupant,
a retractor that is provided at the vehicle width direction central side of the seat, a leading end portion of the second webbing extending out from the retractor,
an anchor that is provided, at a guide rail extending in a vehicle front-rear direction along a roof side rail at the vehicle width direction outside of the seat, so as to be capable of moving through a slider, the leading end portion of the second webbing being fixed to the anchor,
a drive motor that is coupled to the slider and that is actuated to move the slider and the anchor along the guide rail, and
a controller that is electrically connected to a collision prediction sensor and that controls actuation of the drive motor, wherein:
in a state prior to actuation of the two-point automatic seatbelt, the anchor is disposed at an initial position that allows the occupant to sit down in the seat,
after the first webbing has been placed over the occupant, the drive motor is actuated to move the anchor to a standby position that is at a vehicle rear side of the initial position and that is a position partway along the guide rail, and the second webbing is placed in standby in an unrestrained state of the occupant at the standby position, and
in a case in which the controller has predicted a vehicle collision based on a signal output from the collision prediction sensor, the drive motor is actuated to move the anchor from the standby position toward the vehicle rear side, and the second webbing is placed over the occupant.

2. The four-point seatbelt device of claim 1, wherein:
a rear end portion of the guide rail is bent toward a vehicle lower side following a center pillar of the vehicle; and
in a case in which the controller has predicted a vehicle collision, the drive motor is actuated to dispose the slider at the rear end portion of the guide rail from the standby position.

3. The four-point seatbelt device of claim 1, wherein:
the controller is electrically connected to a direction indicator of the vehicle; and
in a case in which the controller has detected actuation of the direction indicator, the drive motor is actuated to move the anchor from the standby position toward the vehicle rear side.

4. The four-point seatbelt device of claim 1, wherein:
the controller is electrically connected to a brake pedal sensor or an acceleration sensor of the vehicle; and
in a case in which the controller has detected a sudden deceleration of the vehicle based on a signal output from the brake pedal sensor or from the acceleration sensor to the controller, the drive motor is actuated to move the anchor from the standby position toward the vehicle rear side.

5. The four-point seatbelt device of claim 1, wherein:
the controller is electrically connected to a vehicle stability control device that suppresses lateral sliding of the vehicle; and
in a case in which the controller has detected actuation of the vehicle stability control device, the drive motor is actuated to move the anchor from the standby position toward the vehicle rear side.

6. The four-point seatbelt device of claim 1, wherein:
the controller is electrically connected to at least one of a yaw sensor or a rollover detection sensor of the vehicle; and
in a case in which the controller has detected a sudden turn or a rollover of the vehicle based on a signal output from the yaw sensor or from the rollover detection sensor to the controller, the drive motor is actuated to move the anchor from the standby position toward the vehicle rear side.

* * * * *